(12) United States Patent
Blomster et al.

(10) Patent No.: US 9,134,171 B2
(45) Date of Patent: Sep. 15, 2015

(54) APPARATUS FOR MONITORING THE PROCESS PERFORMANCE OF A LASER SYSTEM WITH A POWER OPTICAL FIBER

(71) Applicant: OPTOSKAND AB, Mölndal (SE)

(72) Inventors: Ola Blomster, M•lindal (SE); Hans Bergstrand, Lerum (SE); Mats Blomqvist, G•teborg (SE)

(73) Assignee: OPTOSKAND AB, Molindal (SE)

( * ) Notice: Subject to any disclaimer, the term of this patent is extended or adjusted under 35 U.S.C. 154(b) by 0 days.

(21) Appl. No.: 14/363,829

(22) PCT Filed: Dec. 18, 2012

(86) PCT No.: PCT/SE2012/051420
§ 371 (c)(1),
(2) Date: Jun. 9, 2014

(87) PCT Pub. No.: WO2013/095272
PCT Pub. Date: Jun. 27, 2013

(65) Prior Publication Data
US 2014/0346330 A1    Nov. 27, 2014

(30) Foreign Application Priority Data
Dec. 19, 2011    (SE) .................................... 1100933

(51) Int. Cl.
*G01J 1/04* (2006.01)
*G01J 1/42* (2006.01)
(Continued)

(52) U.S. Cl.
CPC . *G01J 1/42* (2013.01); *B23K 26/03* (2013.01); *G01J 1/0425* (2013.01); *G01J 1/4257* (2013.01); *G01M 11/35* (2013.01); *G02B 6/4296* (2013.01); *G01J 1/429* (2013.01); *G01J 1/44* (2013.01)

(58) Field of Classification Search
CPC ......... G01J 1/0425; G01J 1/42; G01J 1/4257; G01J 2001/4247

USPC ............ 250/227.14–227.2, 221, 205; 385/11, 385/13, 27–33
See application file for complete search history.

(56) References Cited

U.S. PATENT DOCUMENTS

| 4,385,832 A | 5/1983 | Doi |
| 4,812,641 A | 3/1989 | Ortiz |

(Continued)

FOREIGN PATENT DOCUMENTS

| DE | 3031589 A1 | 3/1981 |
| DE | 324290 A1 | 6/1983 |

(Continued)

OTHER PUBLICATIONS

International Search Report issued in corresponding PCT/SE2012/051420, Sep. 4, 2013, pp. 1-3.

*Primary Examiner* — Que T Le
(74) *Attorney, Agent, or Firm* — Jeffrey S. Melcher; Manelli Selter PLLC

(57) ABSTRACT

The present invention relates to an apparatus for monitoring the process performance of a laser system with a high-power optical fiber cable (3), specifically an optical fiber cable made for transmitting power levels up to and exceeding 20 kW. Generally the fiber cable has an entrance end (1) for an incident beam-light and an exit end (2) where the beam-light is leaving the optical fiber, and wherein at least one of the ends is provided with a connector device (4,5) having sensor means (14) for monitoring the optical fiber cable status. According to the invention the sensor means (14) are located inside the connector device (4,5) and arranged for monitoring and controlling a laser application process during action as well as detection of conditions within the connector device, such as scattered light, temperatures or the like. The sensors (14) are connected to a fiber interlock circuit (30) to activate an interlock break when measured signals are higher than threshold levels (31) and the comparison of the signals to the threshold values is integrated inside the connector device (4, 5). Preferably the sensor means includes diodes (15,16,17) of the light sensor type located in the rear part of the connector device (14,15). A very fast interlock break system is then provided which has the signal control integrated inside the fiber connector.

18 Claims, 2 Drawing Sheets

(51) Int. Cl.
  *B23K 26/03* (2006.01)
  *G01M 11/00* (2006.01)
  *G02B 6/42* (2006.01)
  *G01J 1/44* (2006.01)

(56) References Cited

U.S. PATENT DOCUMENTS 5,219,345 A * 6/1993 Potter ............................ 606/15
5,497,442 A    3/1996 Roos

| 2005/0013525 | A1 | 1/2005  | Blomster |
| 2005/0286043 | A1 | 12/2005 | Weinert  |
| 2009/0238521 | A1 | 9/2009  | Oba      |

FOREIGN PATENT DOCUMENTS

| DE | 4032967    | A1 | 4/1991 |
| EP | 0 507 483  | A  | 7/1992 |
| WO | 01/44849   | A1 | 6/2001 |
| WO | 03/016854  | A1 | 2/2003 |

* cited by examiner

APPARATUS FOR MONITORING THE PROCESS PERFORMANCE OF A LASER SYSTEM WITH A POWER OPTICAL FIBER

FIELD OF THE INVENTION

The present invention relates to an apparatus for monitoring the performance of a high-power optical fiber cable, specifically an optical fiber cable made for transmitting power levels up to and exceeding 20 kW. Generally the optical fiber cable has an entrance end for an incident beam-light and an exit end where the beam-light is leaving the optical fiber, and wherein at least one of the ends is provided with a connector device having sensor means for monitoring the optical fiber cable status.

BACKGROUND OF THE INVENTION

Optical fibers for transmitting high optical power are frequently used in industrial applications. Specifically they are used in cutting and welding operations by means of high-power laser radiation, but also in other industrial applications such as heating, detection or working operations in high-temperature environments this type of optical fibers can be used. By means of the optical fibers it is possible to design flexible manufacturing systems for transmitting the laser beam from the high power laser source to the workpiece. An optical fiber typically has an inner glass core and a transparent, surrounding layer, a so-called cladding, having a lower refractive index than the glass core. The function of the cladding is to keep the optical beam confined to the core.

For a long period of time $CO_2$-lasers were the main player on the market for high power industrial lasers. However, at the beginning of the 90s, the Nd:YAG laser started to be a tool for high power applications and the development of fiber optic technology for these type of lasers has become a hot topic.

When designing optical fiber systems for high power laser radiation it is important that the fiber is not damaged in any way because the radiation from a "leaking" or damaged fiber might cause serious personal injuries. Therefore it is previously known to check the status of the fiber by means of specific monitoring systems. See for instance U.S. Pat. No. 4,812,641, DE 4032967, DE 3246290, DE 3031589 and U.S. Pat. No. 5,497,442.

However, it is important to detect damage in the optical fiber not only for security reasons but also for preventing secondary damage in other parts of the system due to said damages or imperfections in the fiber. A weakness in the detecting systems referred to above is the fact that the detection of damage comes too late. When the radiation from the damaged fiber is detected, secondary damage in the optical system might already have occurred.

In WO 03/016854 a device is described in which a detector for sensing substantially radially spread radiation from incident optical radiation is arranged in connection with the entrance and/or exit parts of the fiber. If this substantially radially spread radiation exceeds a certain level this is used as an indication of a damage in the entrance and/or exit zone of the fiber. The detector is arranged in connection with or at a distance from the entrance or exit end of the fiber and the radially spread radiation is then arranged to be transmitted to the detector via optics.

However, in industrial applications using high brilliance lasers at power levels up to and exceeding 20 kW and similarly diode lasers exceeding 10 kW, there is an increasing demand to continuously monitor component status even in passive components such as fiber-optic cables. With fiber-optic cables designed according to the European Automotive Industry fiber standard interface there is a demand to monitor and handle extreme levels of power losses. There is also a demand to provide a more rugged and flexible connector without having detectors and optics arranged at a distance from the entrance or exit end of the fiber as described in WO 03/016854.

SUMMARY OF THE INVENTION

It is an object of the present invention to provide a very fast and reliable sensor system for monitoring the laser performance.

According to the invention the sensor means are located inside the connector device and arranged for monitoring and controlling the laser application process during action as well as detection of specific conditions within the connector device, such as scattered light, temperatures or the like.

According to a preferred embodiment of the invention the sensors are connected to a fiber interlock circuit to activate an interlock break when measured signals are higher than threshold levels and wherein the comparison of the signals to the treshold values is integrated inside the connector device. The treshold levels could then be set to absolute or differentiated values.

According to a further preferred embodiment of the invention the sensors are connected to the fiber interlock circuit in a closed loop circuit.

BRIEF DESCRIPTION OF THE DRAWINGS

In the following the invention will be described more in detail with reference to the accompanying drawings in which FIG. 1 schematically illustrates a model of input and output fiber optical connectors with sensors according to the invention.

DETAILED DESCRIPTION OF THE INVENTION

Figure 1:
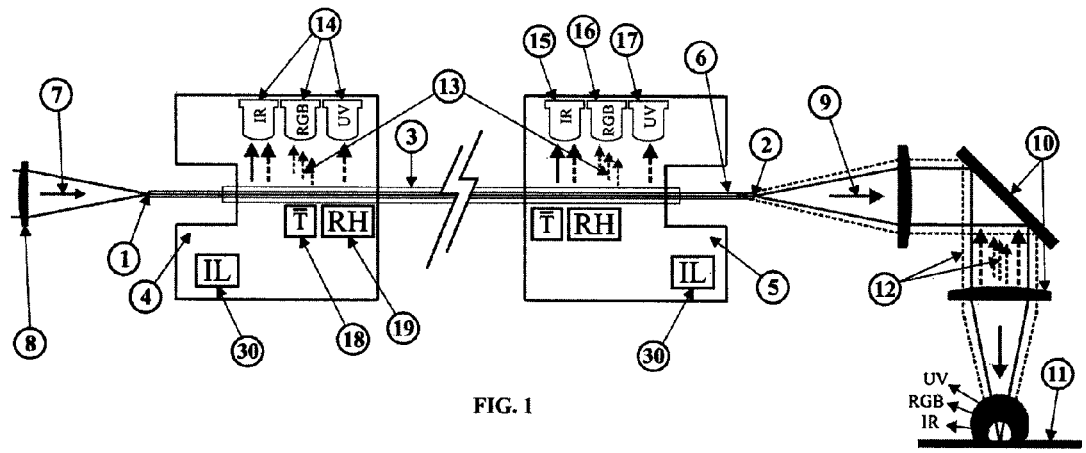

FIG. 1 illustrates schematically a model of the input end 1 and the output end 2 of an optical fiber 3. The optical fiber 3 is provided with an input side connector 4 at the input end 1 and an output side connector 5 at the output end 2. The optical fiber 3 in itself has a conventional design having a core, for example of quartz glass, and a surrounding cladding with a lower refractive index than the glass core, for example made of glass or some polymer having a suitable refractive index. The function of the cladding is to keep the radiation within the core so that the radiation is transmitted through the fiber in its longitudinally direction until it leaves the fiber at the output end 2.

The core and the cladding are the optically active parts of the fiber. Outside the cladding there are further layers arranged in the form of a buffer layer and a jacket 6 in order to increase the mechanical strength of the fiber. The most common buffer material is a silicone rubber like material. For the mechanical strength, it is important that the buffer layer sticks well to the cladding surface. The material of the jacket can be for instance acrylate, nylon or Tefzel, a Teflon like material. Core, cladding, buffer and jacket layer arrangements are known per se and will not be described in any detail here.

To meet the demands of a general fiber interface, defined by the European Automotive Industry, the input side connector 4 has an outer design adapted for connecting the fiber to the laser source and the output side connector 5 has an outer design adapted to the manufacturing interface. As to the internal design of fiber connectors of this type it is referred to EP 0619508, EP 1982221, EP 2162774 and EP 2191311 illustrating glass cylinders of quartz on both fiber ends for minimal power losses and internal water cooling which effectively absorbs back-reflected light from the work piece.

The incident laser beam 7 in forward direction is focused on the end surface of the fiber input end 1 by means of optics in the form of a lens 8 or mirrors. The outgoing beam 9 at the exit end of the fiber is focused by means of a suitable optical lens and mirror system 10 on the work piece 11 for the industrial laser application. The laser source used for this type of industrial laser processing is typically a solid state laser such as a fiber laser, disc laser or a Nd:YAG laser for which optical fibers can be used. Common for these type of lasers is the high optical power which might cause injuries to personnel as well as damage to the optical system if the radiation is not correctly transmitted through the fiber. Even a small imperfection in the fiber can become critical and cause serious personal injuries as well as material damage.

That part of the fiber which is most exposed to the radiation is the entrance or exit and consequently it is often here that damage occurs. A damage in this part gives rise to a spread radiation also in a more or less radial direction from the fiber. In FIG. 1 back-reflected light (process light) 12 from the laser process at the fiber exit end is illustrated. Also illustrated is scattered, spread radiation in the form of beam light or process light 13 leaving the fiber through the cladding layers and jacket which radiation is detected by sensor means 14 which will be further described below.

As already mentioned, the fiber connectors 4,5 could be designed for minimal power losses and provided with internal water cooling which effectively absorbs back-reflected light from the work piece 11. As already mentioned in the introductory portion it is also previously known to provide a photo detector to sense the spread radiation in order to prevent damage, see WO 03/016854. It is mentioned in said WO publication that the detector can be arranged to sense the radiation directly or indirectly by means of a transparent diffuser. It is also mentioned here that the photo detector is preferably arranged in connection with the entrance part of the fiber, or arranged at a certain distance from this end.

However, there is a demand for a more fast, accurate and reliable monitoring of the component status of the fiber optic cables when extreme levels of power losses could occur. There is also a demand to provide a more rugged and flexible connector without having detectors and optics arranged at a distance from the entrance or exit end of the fiber as described in WO 03/016854.

According to the invention the sensor means 14 are located inside and preferably in the rear part of the connector device and arranged for monitoring and controlling the laser application process during action as well as detection of specific conditions within the connector device, such as scattered light, temperatures or the like. The sensors are connected to a fiber interlock circuit 30 to activate an interlock break when measured signals are higher than threshold levels. Specifically, the integral sensor means 14 are arranged for sensing the scattered light leaving the fiber substantially in the radial direction. The sensor means are then arranged for sensing beam light, which is the laser beam going from the laser source towards the application process, as well as process light, which is the light sent back from the application process. The beam light consists only of the wave length sent out by the laser source, while the process light from the application process consists not only of reflections from the laser beam against parts in the process but also of all other wave lengths depending on the material used in the application process and how the process is performed.

Depending on the mechanical interface around the optical fiber it is possible to use the small amount of light leaving the optical fiber for safety monitoring and process control. The laser light used for material processing is going in the forward direction. The light from the process itself is going in the backwards direction and can be detected by the sensor means 14 through the cladding and buffer layers and through the jacket. The sensor means are located in the rear part of the optical connector, which is a perfect place to put the sensors. By putting the sensors here they are well protected from dust and from other effects around the process. The accuracy and reliability will last and when changing fibers, the same signal will easily be accessible with some offset.

As already mentioned the signals to the sensor means can either come from the beam in the forward direction or beam and process light reflected back from the application process. To distinguish between beam light from the forward direction and beam light from the back-reflected direction, the two connectors can be used together. The back-reflected beam light is visible in both of the connectors, but will be stronger inside the output side connector 5.

The beam light, which is the light in the forward direction, can be used to monitor the beam going into the fiber and use the signal from the sensor means 14 to align the fiber correctly. The process light can be used to monitor the process and the application. By looking at the process light using the sensor means it is possible to qualify the process or to make adjustments.

The sensor means includes in this case three separate photo diode light sensors, an IR light sensor 15, an RGB light sensor 16 and an UV light sensor 17, diodes of a type suitable for detecting scattered light. This type of light sensors reacts on scattered light which makes it the fastest of the sensors. Any increased value of light inside the connector detected by the sensors is an indication of fiber failure. The sensors are looking right at the bare core of the optical fiber. By using light, the fast reaction of the light sensors is a valuable tool to avoid any further damage in the laser system. It is also possible to use the sensor or sensors value as a help when aligning the fiber to a FCU (Fiber Coupling Unit).

Preferably there are also arranged an Absolute Temperature 18 and Humidity sensors 19 within the fiber connector. An Absolute Temperature sensor within the connector device measures the absolute temperature inside the fiber connector. The intended use is to supervise the absolute temperature. It is a good indication of the long-term stability of the fiber. An integral Delta T sensor measures the difference in temperature between incoming and outgoing cooling water, see FIGS. 4-5 below. This is a way to supervise the power losses in the fiber connector. Misalignment of the fiber and bad cleaning of the quartz cylinder are some examples of conditions that are directly reflected as power losses in the fiber connector. Also insufficient water flow is visible as a high Delta T value. The Humidity Sensor 19 for measuring the humidity inside the fiber connector is also located within the connector. The intended use is to detect any water leakage in the connector.

Figure 2:
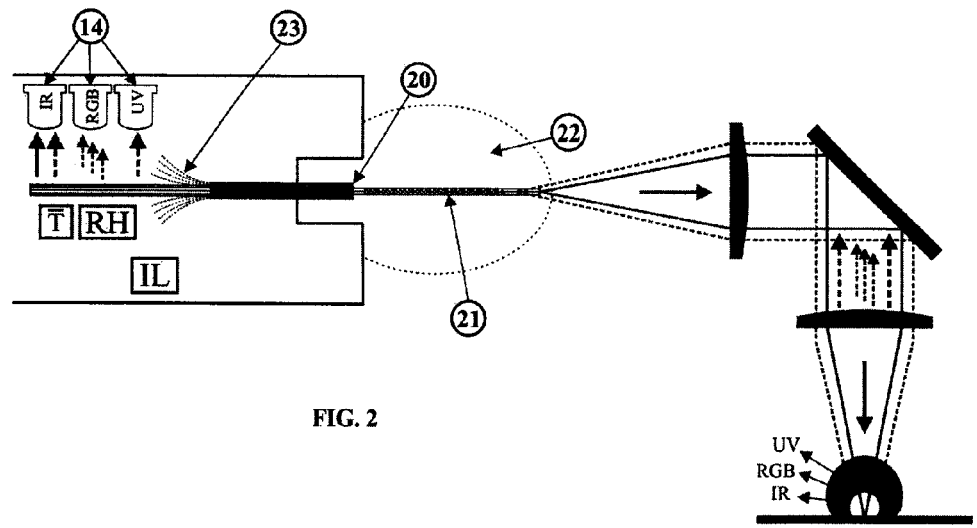
FIG. 2 illustrates an optical fiber design with glass capillary and mode-stripper.

In FIG. 2 it is illustrated sensor means 14 for an optical fiber design with glass capillary 20 and mode-stripper 21. It is previously known to use arrangements like mode stripper and glass capillary to manipulate the back-reflected light to increase or decrease the signal to the light sensors. The mode stripper 21 will remove the light inside the cladding to the optical room 22. From the optical room 22 the light can be transmitted to the light sensors 14 in the rear part of the connector through the glass capillary tube 20. Back reflected light through the glass capillary tube to the light detectors is indicated by 23 in FIG. 2. Beam-light or process-light will also leave the optical fiber through the buffer and jacket and will be detected in the same way as the light through the glass capillary 20.

Figure 3:
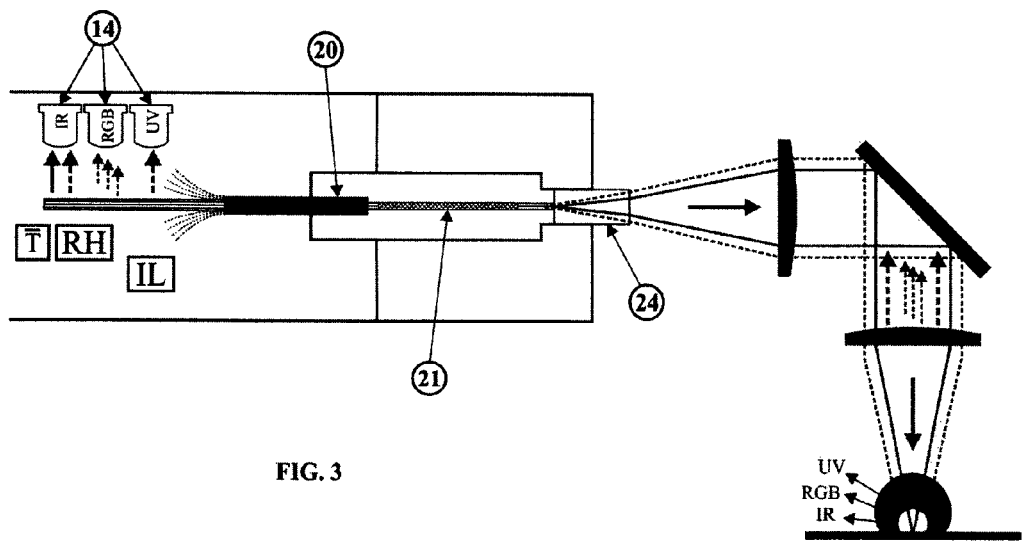
FIG. 3 illustrates an optical fiber design with glass capillary, mode-stripper and glass cylinder, preferably a glass cylinder made of quartz.

In FIG. 3 it is illustrated sensor means 14 in combination with an optical fiber design with glass capillary 20, mode-stripper 21 and glass cylinder 24. It is previously known to seal the optical room and to add good performance to the connector design by means of a glass cylinder 24, with or without an AR-coating, which terminates the connector entrance. Like in FIG. 2, back reflected light through the glass capillary tube to the light detectors is also indicated in FIG. 3.

Figure 4:
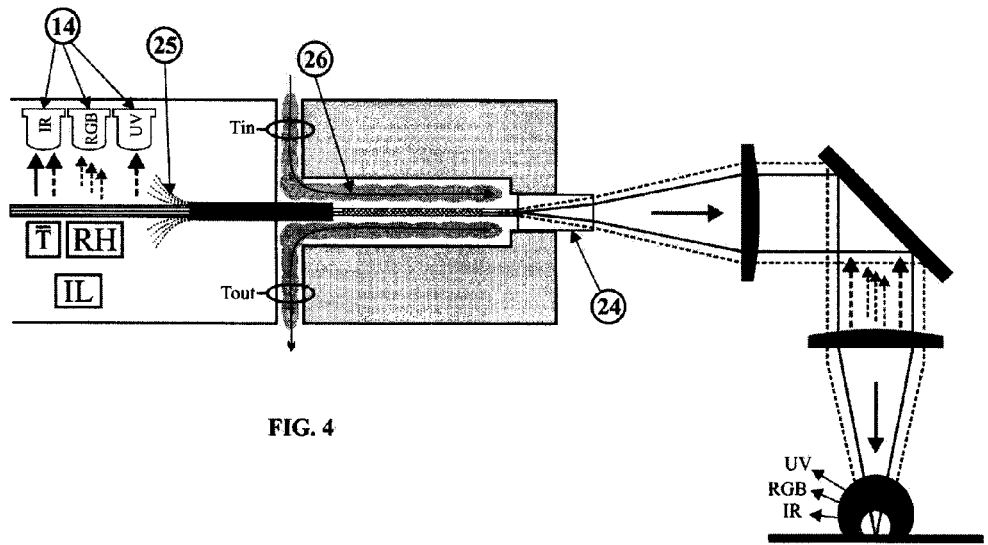
FIG. 4 illustrates an optical fiber design with cooling water inside the connector.

In FIG. 4 it is illustrated sensor means 14 in combination with an optical fiber design with cooling water 26 inside the connector behind a glass cylinder 24 and a glass (quartz) capillary. In this case the optical room is filled with water to cool the connector and absorb back reflected light which is not used by the laser application. The cooling water is floating just behind the glass cylinder 24 and is surrounding the optical fiber and the mode stripper. The water is also surrounding the glass capillary 20, which is the light transmitter between the optical room and the rear part of the connector where the light sensors 14 are located. Back reflected light through the glass capillary tube to the light detectors is indicated by 25 in FIG. 4.

By measuring the temperature of the incoming water Tin and the temperature of the outgoing water Tout, the differential temperature dT can be calculated. Together with the signal from the light sensors this is a strong feed back indicator from the application where the laser beam is used. These two signals (light sensor signal and differential temperature signal) can be monitored and can assist with adjustments to the application process in a closed loop circuit. This will in the end improve quality and efficiency in the laser process.

Figure 5:
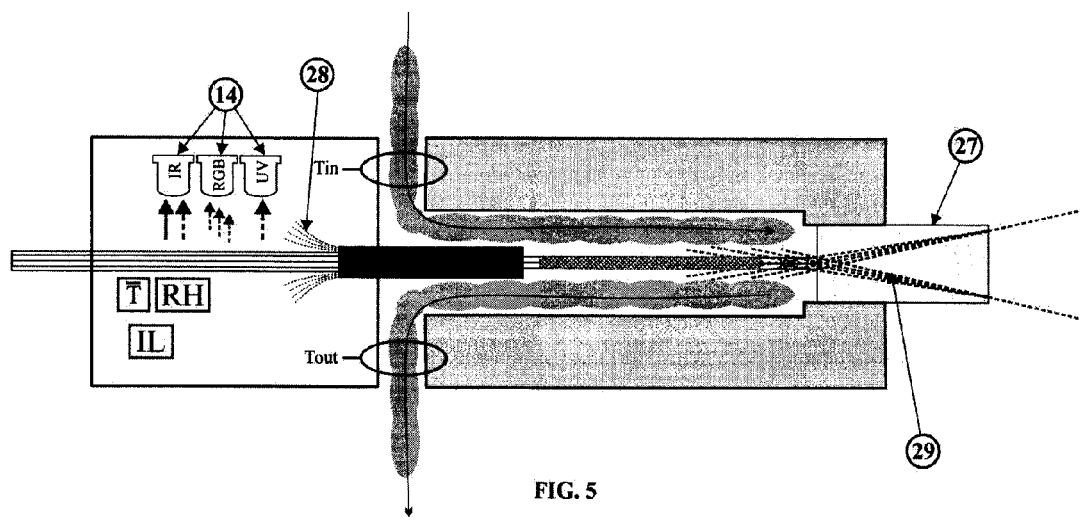
FIG. 5 illustrates an optical fiber design in which the glass cylinder is separating the light in different wavelengths.

In FIG. 5 it is illustrated sensor means 14 in combination with an optical fiber design with cooling water 26 inside the connector behind a glass cylinder 27 and a glass (quartz) capillary 20 and in which the glass cylinder 27 is separating the light in different wavelengths. By using the glass cylinder 27 as termination of the optical fiber, the process-light will divide into a spectrum 28 inside the glass cylinder. The focus will shift due to the different wavelengths crossing the materials with different refractive indices. This will finally increase the signal to the light sensors 14 through the glass capillary 20. Back reflected light through the glass capillary tube 20 to the light detectors is indicated by 28 in FIG. 5

Figure 6:
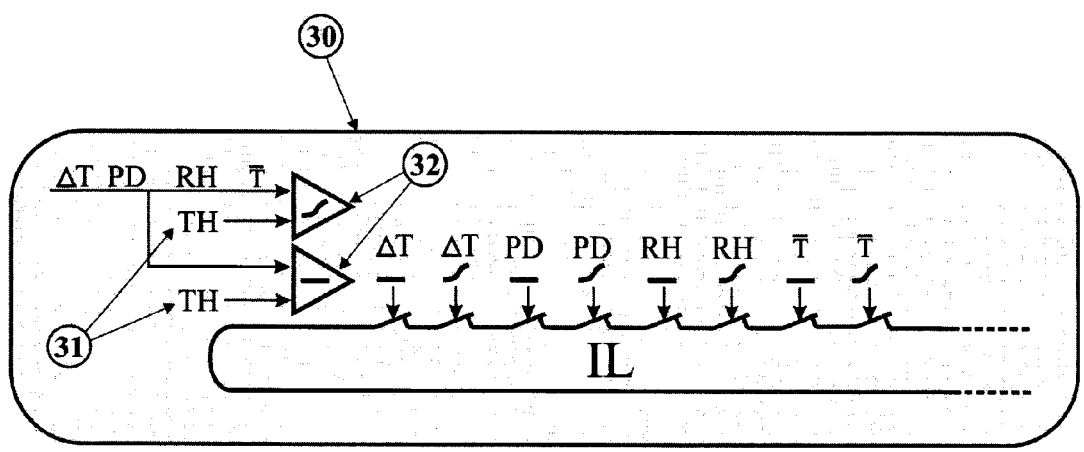
FIG. 6 illustrates a fiber interlock circuit according to the invention.

All the sensors described so far are connected to the fiber interlock circuit, where interlock break-enable functions are activated when measured signals are higher than threshold levels 31, as illustrated in FIG. 6. For the comparison in 32 the treshold level could then be set to an absolute value or a differential (changing in level) value.

It is a very fast interlock break system as the control of the signals is integrated in the electronics inside the fiber connector. Also, since all signals can be logged it is possible to evaluate what happened inside the connector before the interlock break instance. The communication to the fiber optical connectors is preferably provided via a CAN interface. Thus it is straight forward to develop the existing laser host control to also control the CAN-messages from the light sensors 14.

The sensors are connected to the fiber interlock circuit 30 in a closed loop circuit setup, wherein the main loop in the fiber connector sensor electronics measures the parameters for instance every 10 ms. Comparison with the set threshold level is made every iteration. The break time for the relay unit is approximately 3 ms. Then, the time for the sensor to break the interlock circuit is less than 20 ms. The response time means the time for a sensor to react and to break the interlock circuit. There is always an amount of time to warm a material up, this time is not included in the response time. For this reason said sensors are the fastest since they react to light. The sensors can be set to different threshold values that can control the relay unit in the interlock circuit and break the interlock at a set value. The threshold values can be set by a computer that also is used for monitoring the laser application process.

The invention is not limited to the examples described above, but can be varied within the scope of the following claims.

The invention claimed is:

1. An apparatus for monitoring the process performance of a laser system with a high-power optical fiber cable comprising:
    an entrance end for an incident beam-light; and
    an exit end where the beam-light is leaving the optical fiber, wherein at least one of the ends is provided with a connector device having sensor means for monitoring the optical fiber cable status, and wherein the sensor means are located inside the connector device and arranged for monitoring and controlling a laser application process during action as well as detection of conditions within the connector device.

2. The apparatus according to claim 1, wherein the optical fiber cable is made for transmitting power levels up to and exceeding 20 kW.

3. The apparatus according to claim 1, wherein the sensor means are connected to a fiber interlock circuit to activate an interlock break when measured signals are higher than threshold levels and wherein the comparison of the signals to the threshold levels is integrated inside the connector device.

4. The apparatus according to claim 3, wherein said treshold levels have been set to absolute values.

5. The apparatus according to claim 3, wherein said treshold levels have been set to differential values.

6. The apparatus according to claim 1, wherein the sensor means are located in the rear part of the connector device.

7. The apparatus according to claim 1, wherein the sensor means are arranged for sensing scattered light in the form of beam light, which is the laser beam going from the laser source of the laser system towards the application process, as well as process light, which is the light sent back from the laser application process.

8. The apparatus according to claim 3, wherein the sensor means are connected to the fiber interlock circuit in a closed loop circuit.

9. The apparatus according to claim 7, wherein the sensor means are arranged for sensing scattered light leaving the fiber cable substantially in the radial direction.

10. The apparatus according to claim 7, wherein the sensor means are arranged for sensing back reflected light leaving a glass capillary tube surrounding the fiber cable.

11. The apparatus according to claim 1, wherein the sensor means comprises at least one photo diode light sensor.

12. The apparatus according to claim 11, wherein the photo diode light sensor is at least one of an IR light sensor, an RGB light sensor, or an UV light sensor.

13. The apparatus according to claim 11, wherein the sensor means comprises three photo diode light sensors.

14. The apparatus according to claim 1, wherein the sensor means comprises an Absolute Temperature Sensor inside the connector device for measuring the absolute temperature inside the fiber connector.

15. The apparatus according to claim 1, wherein the sensor means comprises A Delta T Sensor inside the connector device for measuring the difference in temperature between incoming and outgoing cooling water inside the fiber connector.

16. The apparatus according to claim 1, wherein the sensor means comprises a Humidity Sensor inside the connector device for measuring the humidity inside the fiber to detect any water leakage in the connector.

17. The apparatus according to claim 1, wherein the information from the sensor means is used for feedback to the laser application process for quality control of the process.

18. The apparatus according to claim 17, wherein the information from the sensor means is implemented in a closed loop circuit for regulating the laser application process for desired process result.

* * * * *